United States Patent
Wanchoo et al.

(10) Patent No.: US 11,763,072 B2
(45) Date of Patent: Sep. 19, 2023

(54) SYSTEM AND METHOD FOR IMPLEMENTING A DOCUMENT QUALITY ANALYSIS AND REVIEW TOOL

(71) Applicant: KPMG LLP, New York, NY (US)

(72) Inventors: Ajay Wanchoo, Bernardsville, NJ (US); Chaitanyasinh Ejner, Kearny, NJ (US); Francesco Grossi, New York, NY (US)

(73) Assignee: KPMG LLP, New York, NY (US)

( * ) Notice: Subject to any disclaimer, the term of this patent is extended or adjusted under 35 U.S.C. 154(b) by 0 days.

(21) Appl. No.: 17/896,274

(22) Filed: Aug. 26, 2022

(65) Prior Publication Data
US 2023/0062032 A1    Mar. 2, 2023

Related U.S. Application Data

(60) Provisional application No. 63/237,308, filed on Aug. 26, 2021.

(51) Int. Cl.
*G06F 17/00*        (2019.01)
*G06F 40/169*       (2020.01)
(Continued)

(52) U.S. Cl.
CPC .......... *G06F 40/169* (2020.01); *G06F 40/171* (2020.01); *G06F 40/279* (2020.01)

(58) Field of Classification Search
CPC .... G06F 40/169; G06F 40/171; G06F 40/279; G06F 40/253
See application file for complete search history.

(56) References Cited

U.S. PATENT DOCUMENTS

| | | | | |
|---|---|---|---|---|
| 6,122,649 A | * | 9/2000 | Kanerva | .......... G06F 40/10 715/210 |
| 8,521,665 B1 | * | 8/2013 | Kumar | .......... G06F 16/951 706/12 |

(Continued)

OTHER PUBLICATIONS

Eric G. Suder, et al. v. *Commissioner*, U.S. Tax Court, CCH Dec. 60,038(M), T.C. Memo. 2014-201,108 T.C.M. 354, Oct. 1, 2014, pp. 1-31.

(Continued)

*Primary Examiner* — Laurie A Ries
(74) *Attorney, Agent, or Firm* — Hunton Andrews Kurth LLP

(57) ABSTRACT

The invention relates to computer-implemented systems and methods for assessing the quality of a document or a technical memorandum written with a loosely defined template, stereotype and/or outline of key sections or headers. An embodiment of the present invention leverages Natural Language Processing (NLP) and Machine Learning (ML) techniques to identify key sections in a document using NLP text patterns and further establish, using ML, how closely a given section matches similar sections in other documents that are considered by human Subject Matter Experts (SMEs) to be "well-written" for the intended purpose of the overall document. An embodiment of the present invention further ascertains whether the overall flow of the document follows a general outline in terms of the order of sections.

20 Claims, 9 Drawing Sheets

(51) Int. Cl.
*G06F 40/171* (2020.01)
*G06F 40/279* (2020.01)

(56) References Cited

U.S. PATENT DOCUMENTS

| | | | | |
|---|---|---|---|---|
| 11,144,579 | B2* | 10/2021 | Bull | G06N 3/084 |
| 11,194,964 | B2* | 12/2021 | Mishra | G06F 40/253 |
| 11,354,501 | B2* | 6/2022 | Lall | G06F 40/242 |
| 11,373,424 | B1* | 6/2022 | Fleming | G06V 30/19147 |
| 11,373,739 | B2* | 6/2022 | Ozeran | G16H 10/60 |
| 11,556,559 | B1* | 1/2023 | Hanby, IV | G06F 21/10 |
| 11,556,596 | B2* | 1/2023 | Wang | G06F 16/9535 |
| 11,556,698 | B2* | 1/2023 | Galitsky | G06N 20/00 |
| 2006/0277091 | A1* | 12/2006 | Kochikar | G06Q 10/10 705/7.14 |
| 2014/0172417 | A1* | 6/2014 | Monk, II | G06F 40/30 704/9 |
| 2015/0088888 | A1* | 3/2015 | Brennan | G06F 16/24578 707/737 |
| 2017/0256178 | A1 | 9/2017 | Nielson et al. | |
| 2018/0046764 | A1* | 2/2018 | Katwala | G16H 15/00 |
| 2018/0197001 | A1* | 7/2018 | Bender | G06V 30/418 |
| 2019/0108215 | A1* | 4/2019 | Jaroch | G06F 40/253 |
| 2020/0210693 | A1* | 7/2020 | Scanlan | G06Q 10/063 |
| 2022/0129623 | A1* | 4/2022 | Fatma | G06F 40/169 |
| 2022/0188514 | A1* | 6/2022 | Thota | G06F 40/253 |

OTHER PUBLICATIONS

IRS Letter Rulings and TAMs (1954-1997), UIL No. 41.51-03, Letter Ruling 9522001, Dec. 21, 1994, Internal Revenue Service, pp. 1-4.
Federal Tax Regulations, Sec. 1.41-4, Internal Revenue Service, Qualified research for expenditures paid or incurred on or after Jan. 3, 2001, pp. 1-20.
Treasury Decisions, Treasury Decision 8562, T.D. TD8562, Internal Revenue Service, Sep. 30, 1994, pp. 1-4.
International Searching Authority, PCT Notification of International Search Report and Written Opinion, International Application No. PCT/US22/41638, dated Jan. 3, 2023, pp. 1-14.

* cited by examiner

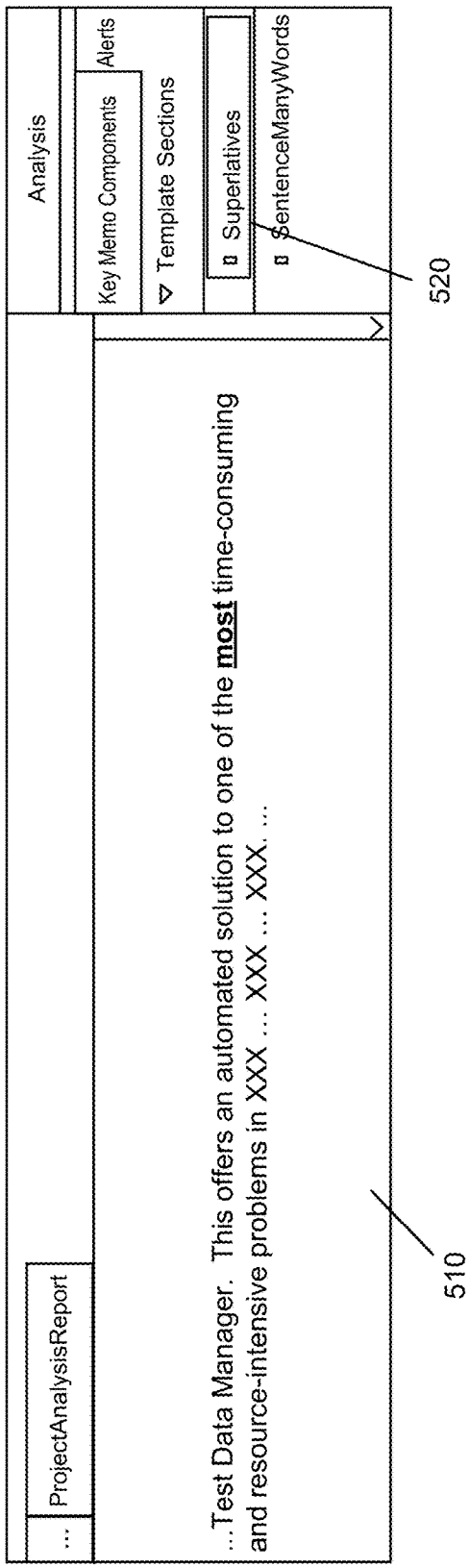
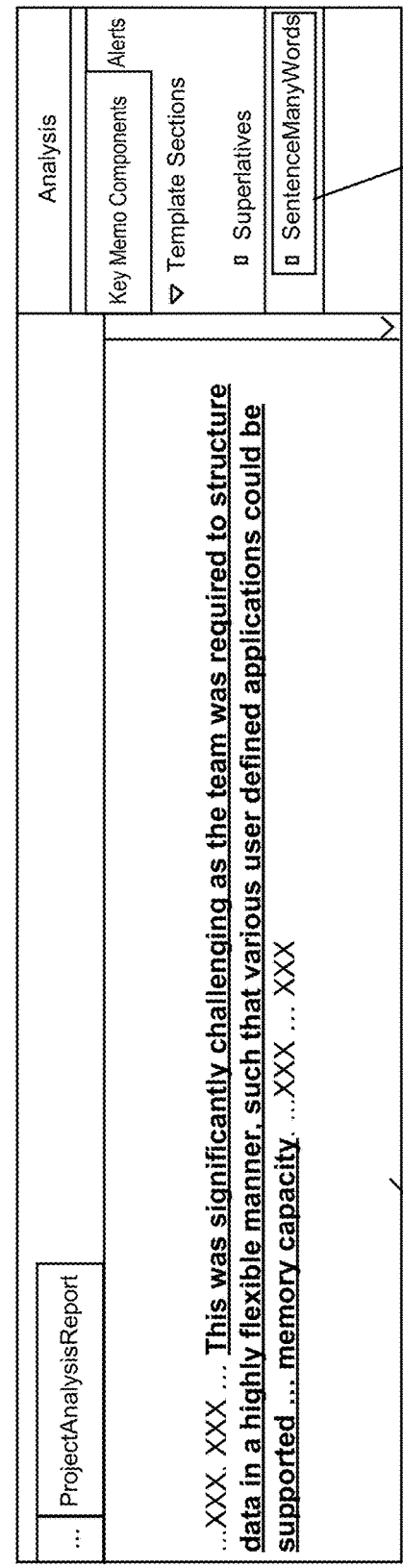
Figure 5
Figure 6

Recently updated | ↰ Back to Work Items

☑ TASK 1xxx23
1xxx23 Show a tooltip with action suggestions
CG C. Gonzalez       ○ 0 comments  [Add tag]

State  ○ To Do      Area       Scout
Reason ▨ New task     Iteration  Scout\Sprint 1

Description

Show a tooltip with action suggestions. Using a template to take the suggestions.

Discussion

CE | *Add a comment. Use # to link a work item, ! to link a pull request, or @ to mention a person.*

Details

Priority
2
Remaining Work

Activity

Blocked

Figure 8

| | | | |
|---|---|---|---|
| Recently updated \| ↻ Back to Work Items | | | |
| ⚐ FEATURE 1xx14<br>1xx14 Interview Transcript<br>CG C. Gonzalez | | 0 comments [Add tag] | |
| State ○ In Progress<br>Reason ※ Additional work found | <u>A</u>rea Scout<br>Inte<u>g</u>ration Scout\Sprint 1 | | |
| Description | | Status<br>Start Date<br>Target Date | |
| Section to clean transcription files and create questionnaires to analyze them. | | | |
| Acceptance Criteria | | Details<br>Priority<br>2<br>Effort | |
| *Click to add Acceptance Criteria* | | | |
| Discussion | | Business Value<br>Time Criticality | |
| CE *Add a comment. Use # to link a work item, ! to link a pull request, or @ to mention a person.* | | Value area<br>Business | |

Figure 9

Recently updated | ↶ Back to Work Items

☑ TASK 1xxx30
1xxx30  Convert Transcript File to Draft Narrative
CG  C. Gonzalez    💬 0 comments   [Add tag]

State  ○  In Progress     <u>A</u>rea        Details
Reason    Work started       Inter<u>a</u>tion   Priority
                             Scout              2
                             Scout\Sprint 1     Remaining Work Activity Blocked

Description

Convert a clean transcript file to a draft Narrative. Use a template to group the answers.

Option 1. Use a couple of names to determine who is the interviewer and who is the interviewee and group the correct text in the document.

Option 2. Show a pop up with a combo box list with all the names of people that appear in the document in order the user can select who is the interviewee.

Discussion

CE  *Add a comment. Use # to link a work item, ! to link a pull request, or @ to mention a person.*

Figure 10

SYSTEM AND METHOD FOR IMPLEMENTING A DOCUMENT QUALITY ANALYSIS AND REVIEW TOOL

CROSS-REFERENCE TO RELATED APPLICATION

This application claims priority to U.S. Provisional Application Ser. No. 63/237,308, filed Aug. 26, 2021, the contents of which are incorporated by reference herein in their entirety.

FIELD OF THE INVENTION

The present invention relates to systems and methods for implementing a document quality analysis and review tool.

BACKGROUND

Entities operating across various industries may benefit from research and development (R&D) tax credits per Internal Revenue Code Section 41. For example, if an entity invests in qualified research activities, a tax credit may be available. Qualified research activities may include internal software solutions and applications as well as various technology advancements. To claim the tax credit, an entity will perform a study that involves identifying, documenting and supporting eligible expenses associated with qualified R&D activities. A thorough R&D analysis and gathering of supporting documentation is therefore needed to properly claim the R&D credits.

The eligibility and documentation requirements are extensive and complex. In addition, there are penalties for improper filings. Claiming the R&D tax credit with improper supporting evidence is risky and costly. The current process is burdensome and manual in nature without clear guidance on a common acceptable form or template.

Modern software development delivery involves lean practices with no formal tracking of engineering personnel and lack of technical documentation. These lean processes are not designed to support the requirements for conducting Section 41 R&D studies and thereby create significant inefficiencies.

It would be desirable, therefore, to have a system and method that could overcome the foregoing disadvantages of known systems.

SUMMARY

According to an embodiment, the invention relates to a computer-implemented system that implements an automated document quality analysis and review tool. The system comprises: an interface that is configured to receive one or more documents; a memory component that stores and manages data relating to curated text patterns based on known approved documents; and a computer processor coupled to the interface and the memory component, the computer processor further configured to perform the steps of: identifying one or more sections from the one or more documents, wherein the one or more sections relate to one or more of: permitted purpose, elimination of uncertainty, technological in nature and process of experimentation; applying the one or more sections to an annotation/section processor that generates a section score based on a curated knowledge base; applying the one or more sections to an antipattern text analyzer that identifies one or more text patterns to generate an antipattern text alert; applying the one or more sections to a readability analyzer that applies a readability rule to generate a readability score; and providing, an interactive user interface, each of the section score, antipattern text alert and readability score.

According to another embodiment, the invention relates to a computer-implemented method that implements an automated document quality analysis and review tool. The method comprises the steps of: identifying, via a computer processor, one or more sections from the one or more documents communicated via an interface, wherein the one or more sections relate to one or more of: permitted purpose, elimination of uncertainty, technological in nature and process of experimentation; applying the one or more sections to an annotation/section processor that generates a section score based on a curated knowledge base that comprises curated text patterns based on known approved documents; applying the one or more sections to an antipattern text analyzer that identifies one or more text patterns to generate an antipattern text alert; applying the one or more sections to a readability analyzer that applies a readability rule to generate a readability score; and providing, an interactive user interface, each of the section score, antipattern text alert and readability score.

An embodiment of the present invention is directed to automating document assessment to achieve consistency, completeness and correctness in structure. An embodiment of the present invention also supports key backend capabilities with automated training. The user interface of the Document Quality Analysis and Review Tool may be powered by a backend knowledge base that learns from a set of documents that have undergone extensive analysis including review by Subject Matter Experts (SMEs), for example. The knowledge base may be created, refined and enhanced by using automated techniques and Natural Language Processing (NLP) patterns to identify relevant and similar sections from multiple curated documents that are extracted and combined into a larger training set. This supports an accelerated process to identify the components of the training set as well as the ability to combine and execute the Machine Learning (ML) training software solution quickly and as many times as needed with reduced human intervention and errors.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 5 is an exemplary user interface, according to an embodiment of the present invention.

FIG. 6 is exemplary user interface, according to an embodiment of the present invention.

FIG. 8 is exemplary user interface, according to an embodiment of the present invention.

FIG. 9 is exemplary user interface, according to an embodiment of the present invention.

FIG. 10 is exemplary user interface, according to an embodiment of the present invention.

DETAILED DESCRIPTION

Figure 1:
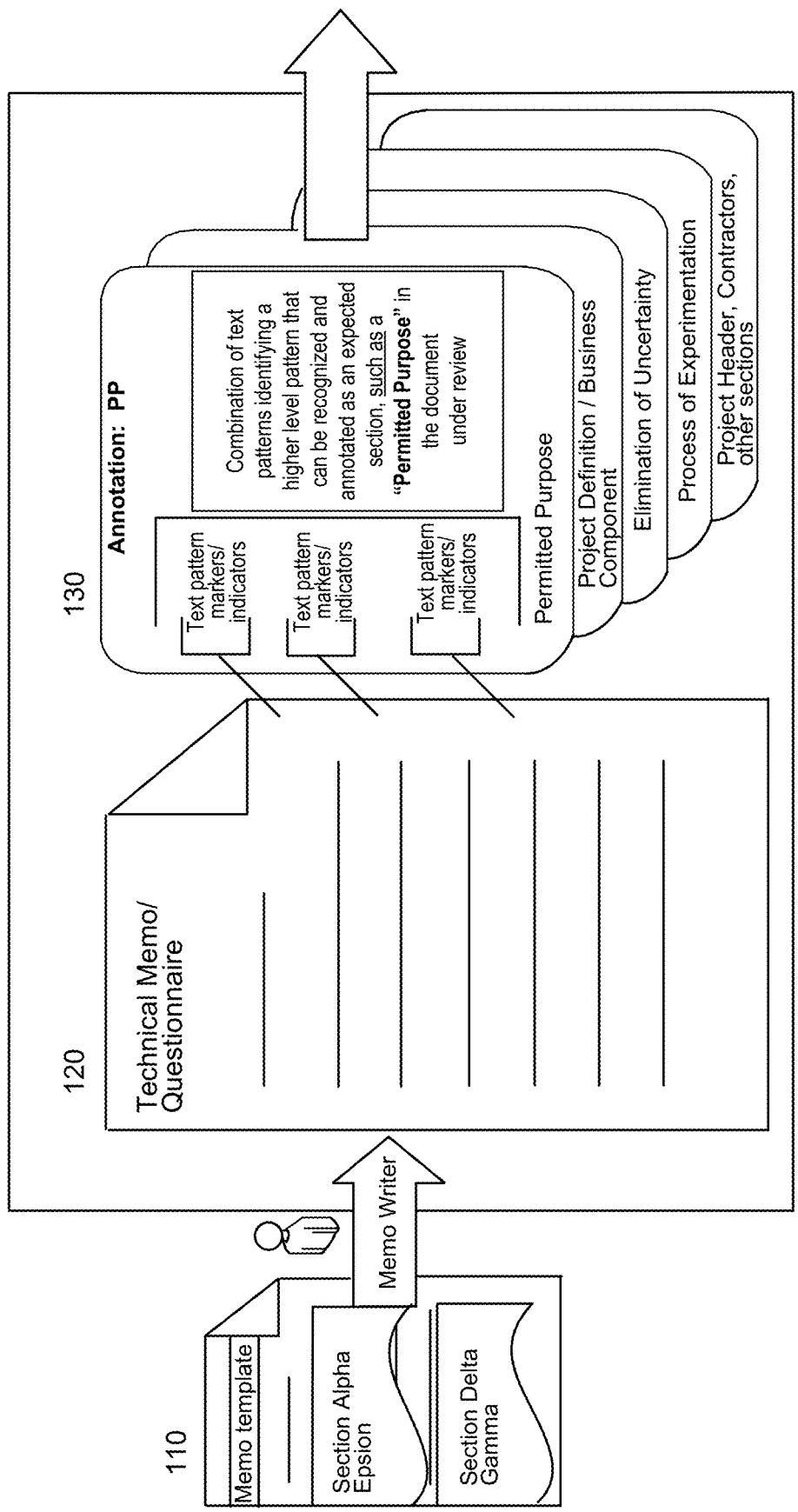
FIG. 1 is an exemplary system diagram, according to an embodiment of the present invention.

Exemplary embodiments of the invention will now be described in order to illustrate various features of the invention. The embodiments described herein are not intended to be limiting as to the scope of the invention, but rather are intended to provide examples of the components, use, and operation of the invention.

An embodiment of the present invention is directed to an innovative system and method that assess the quality of a document or a technical memorandum written with a loosely defined template, stereotype and/or outline of key sections or headers. An embodiment of the present invention leverages Natural Language Processing (NLP) and Machine Learning (ML) techniques to identify key sections in a document using NLP text patterns and further establish, using ML, how closely a given section matches similar sections in other documents that are considered by human Subject Matter Experts (SMEs) to be "well-written" for the intended purpose of the overall document. In addition, an embodiment of the present invention ascertains whether the overall flow of the document follows a general outline in terms of the order of sections. Other stylistic as well as formal requirements and/or preferences may be applied.

The innovative system identifies "anti-patterns" or a specific type of language, phrases, combination of words and/or terms, or more generically any NLP text pattern in any given section that is not preferred or contributes to a weakening of the arguments being made in the document. In addition, a "readability" score may be determined to ensure that the document is not overly complex to an average reader (or other intended audience) who may not be an expert in the specific subject matter being discussed in the document.

Users may interact with the document review tool via a Graphical User Interface (GUI) to navigate through the various sections, analyze scores and/or view alerts associated with the document or documents under review. In addition, similar NLP patterns may be used to automate the identification and selection of appropriate documents to be used for training and further used to extract the individual sections of the documents determined to be "well written" from which the training set for the ML model is created. This enables an automated and accelerated training process to refine the knowledge base against which the ML portion of the solution works to create scores for sections under review.

According to an exemplary illustration, an embodiment of the present invention may be leveraged by various users and teams (e.g., accounting, engineering staff, etc.) to improve efficiency and accuracy in reviewing technical documentation created by team members that conduct technical interviews and further compile the results into a technical narrative. A function of the tool does not change based on who writes the document. The document under analysis may be written by staff, a client tax team, engineering team, etc. The tool enables users to select a single document or a folder of documents, which may be imported through an interface, datafeed or other input. The document's contents may be annotated in line with the headers of the various sections. These headers may be displayed section by section in the User Interface ("UI") as a list of headers. The different sections in the document under review may be recognized by the tool through the definition of NLP text patterns. The tool then allows users to click on (or interact with) the different headers in the list of section headers in the UI. Each user selection highlights text in a section as identified by the NLP pattern corresponding to an overall project within the workbench. Each interaction (e.g., click, input, etc.) with an annotation within the tool runs an analysis to determine the text's readability and determines the strength of the argument written in the document through machine learning capabilities.

The Document Quality Analysis and Review Tool automates the assessment of documents to achieve consistency, completeness and correctness in structure. Consistency may be achieved in the application of quality standards across documents being reviewed. Completeness may be realized by confirmation that key sections have been addressed. Correctness in structure may be represented through confirmation that key pieces of information (e.g., technical relevant text content, etc.) follow the general flow or structure as defined by internal or external guidelines, e.g., guidelines approved by expert practitioners in the field of research credits studies, etc.

An embodiment of the present invention may ensure that the language, including terms, phrases, key concepts, are generally similar to other such documents that have been reviewed and regarded as "good," "well-written" or otherwise approved by SMEs or other sources.

For example, the user may define text patterns to customize the solution for a specific use case. The patterns may be relevant to a project, client, industry, etc. The patterns are not encoded and instead externalized in a declarative manner so that the user may define such patterns as needed for a specific industry, client and/or type of engagement. An embodiment of the present invention may identify various sections and/or anti-patterns that should not be written in the document, other patterns that need to be highlighted as well as the document flow in the form of ordering of sections or presence/absence of sections in various combinations. For example, a particular type of section should not exist or should not exist after another specific section if a certain type of language or text pattern shows up in the first section of the document, etc. Other patterns and specifics may be identified and applied.

An embodiment of the present invention may be implemented through various architectures. For example, the system may include Apache document reader java based libraries (e.g., Tika, PoI, etc.), a text content classifier (e.g., OpenNLP, etc.) and custom NLP patterns for identifying stereotypical patterns (and anti-patterns) in a declarative manner, UIMA (unstructured information management applications) and other supporting libraries. The user interface may display marked-up text annotation and enable user interaction. The system may process multiple annotation types which may be targeted for stereotypical documents, including documents that are written as per templates for a multi-part test, such as the four part test used in the Section 41 R&D Credits studies, or procedural memoranda that may contain other annotations and/or sections that follow general stereotypes in terms of language content and structure pertinent to the R&D Credit study process. An embodiment of the present invention may apply various patterns or anti-patterns of interest in different types of documents/memos that are usually prepared that follow some sort of a stereotype, template and/or general high level document outline.

An embodiment of the present invention is directed to automated creation of training datasets at scale. An implementation of an embodiment of the present invention may leverage Java, Scala and Python programming languages. Other programming languages may be supported.

An embodiment of the present invention is directed to performing a qualitative technical assessment based on tax regulations to determine whether a project, such as a software development project or other development and research work, qualify for a tax credit. Other scenarios, applications and use cases may be considered. Qualitative assessments may be performed on thousands and thousands of projects over a span of time.

Traditionally, engagement teams would make a judgment call with some guidance from sources, such as subject matter experts (SME), industry trends, etc. A claim for a tax credit for a technology project generally involves a review of documents (e.g., designs, algorithms, parameters, etc.), discussions, analysis, etc. This information may then be compiled into a narrative to provide a mapping of technical descriptions to tax regulations. Down the road, this narrative may be scrutinized by an entity, such as the IRS, through an audit, for example.

According to an exemplary illustration, criteria for the narrative may be defined by a multi-part test. An exemplary multi-part test may include a general four part test applied as detailed in Section 41(d) and Treas. Reg. § 1.41-4(a). All "Section" references are to the Internal Revenue Code of 1986 ("IRC") as amended and the Treasury Regulations issued thereunder unless otherwise noted.

In this example, "qualified research" activities must satisfy the following requirements of a four-part test. The four-part test is one example and other requirements and/or tests may be applied.

(1) Permitted Purpose: Section 41(d)(1)(B)(ii) provides that research must be undertaken for the purpose of discovering information which is intended to be useful in the development of a new or improved business component of the taxpayer. For this purpose, Section 41(d)(2)(B) defines a "business component" as any product, process, computer software, technique, formula, or invention that is to be held for sale, lease, or license, or used by the taxpayer in its trade or business. Under Section 41(d)(3)(A), research shall be treated as conducted for a permitted purpose if it relates to (1) a new or improved function, (2) performance, or (3) reliability or quality. Treas. Reg. § 1.41-4(a)(3)(i) clarifies that research is undertaken for the purpose of discovering information if it is intended to eliminate uncertainty that exists because the information available to the taxpayer does not establish the capability or method for developing a business component, or the appropriate design of the business component. The regulations further provide that a taxpayer need not seek information that exceeds, expands or refines the common knowledge of skilled professionals in the particular field of science or engineering, nor is the taxpayer required to succeed in developing a new or improved business component (Treas. Reg. § 1.41-4(a)(3)(ii)). While obtaining a patent is not a precondition for credit availability, Treas. Reg. § 1.41-4(a)(3)(iii) provides that the issuance of a U.S. patent (other than a design patent) is conclusive evidence that a taxpayer has discovered information that is technological in nature that is intended to eliminate uncertainty concerning the development or improvement of a business component.

(2) Technological in Nature: The research must be undertaken for the purpose of discovering information that is "technological in nature." As provided in Treas. Reg. § 1.41-4(a)(4), information is technological in nature if the process of experimentation used to discover such information fundamentally relies on principles of the physical or biological sciences, engineering, or computer science. A taxpayer may employ existing technologies and rely on existing principles of the physical or biological sciences, engineering, or computer science to satisfy this requirement.

(3) Elimination of Uncertainty/Section 174 Expenses: The activity must be one in which the expenditures are eligible to be treated as research expenses under Section 174. This is a definition of the activity, and not a requirement that the taxpayer use an acceptable method of accounting under Section 174 for such expenditures. As described in Treas. Reg. § 1.174-2(a), Section 174 expenditures are costs incurred in connection with the taxpayer's trade or business which represent research and development costs in the experimental or laboratory sense. In contrast to the Section 174 "in connection with" standard, Section 41 requires that qualified research expenses be incurred "in carrying on" a trade or business of the taxpayer (with an exception for in-house research expenses incurred with the principal purpose of using the research results in the future conduct of an active trade or business of the taxpayer or an affiliate, see Sections 41(b)(1) and 41(b)(4)). The term generally includes all such costs incident to the development or improvement of a product . . . . Expenditures represent research and development costs in the experimental or laboratory sense if they are for activities intended to discover information that would eliminate uncertainty concerning the development or improvement of a product. Uncertainty exists if the information available to the taxpayer does not establish the capability or method for developing or improving the product or the appropriate design of the product. Whether expenditures qualify as research or experimental expenditures depends on the nature of the activity to which the expenditures relate, not the nature of the product or improvement being developed or the level of technological advancement the product or improvement represents. The ultimate success, failure, sale, or use of the product is not relevant to a determination of eligibility under Section 174.

The preamble to a 1994 amendment of these regulations state that "[t]he Treasury Department and the IRS agree that a taxpayer's knowledge that a product development project will be successful does not preclude the process of determining the appropriate design of the product from qualifying as research." T.D. 8562, published Oct. 3, 1994.

(4) Process of Experimentation: Section 41(d)(1)(C) requires that "substantially all" of the research activities must constitute elements of a process of experimentation for a qualified purpose. As clarified in Treas. Reg. § 1.41-4(a)(5), a process of experimentation "is a process designed to evaluate one or more alternatives to achieve a result where the capability or the method of achieving that result, or the appropriate design of that result, is uncertain as of the beginning of the taxpayer's research activities."

Treas. Reg. § 1.41-4(a)(6) provides that, if 80 percent (or more) of a taxpayer's research activities with respect to a business component constitute elements of a process of experimentation for a qualified purpose, the "substantially all" requirement is satisfied and 100 percent of such research activities may qualify for the credit even though the remaining 20 percent (or less) of a taxpayer's research activities with respect to that business component do not constitute elements of a process of experimentation for a qualified purpose.

The so-called "core elements" of a process of experimentation require that the taxpayer (either directly or through another party acting on its behalf) fundamentally rely on principles of the physical or biological sciences, engineering, or computer science to:

Identify uncertainty concerning the development or improvement of a business component;

Identify one or more alternatives intended to eliminate that uncertainty; and

Identify and conduct a process of evaluating the alternatives.

A process of experimentation may involve, for example, modeling, simulation, or a systematic trial and error methodology. The regulations further provide: "A process of experimentation must be an evaluative process and generally should be capable of evaluating more than one alternative," as stated in Treas. Reg. § 1.41-4(a)(5)(i).

A process of experimentation is conducted for a "qualified purpose" if the research relates to a new or improved function, performance, reliability or quality. Research is not conducted for a "qualified purpose" if it relates to style, taste, cosmetic, or seasonal design factors (see Section 41(d)(3)), as stated in TAM 9522001 (Dec. 21, 1994); Suder v. Commissioner, T.C. Memo. 2014-201.

An embodiment of the present invention is directed to applying stylistic requirements. This may involve avoiding certain types of subjective terms and phrases. Examples of terms to avoid may include "business as usual," "blazingly fast," "best," and "worst." An embodiment of the present invention may guide users to use objective terms and concepts such as numbers, metrics, etc. Such guidance may be a result of analysis of prior submissions that were deemed acceptable (e.g., survived the audit) and well curated (e.g., acceptable language that supports an elimination of uncertainty). The system may further learn from those terms and examples. When a new narrative is written, an embodiment of the present invention may extract relevant sections, e.g., excerpts that fit a process of experimentation section, and generate a score that represents a likelihood of such language being consistent or compliant with a particular section, e.g., process of experimentation section.

An embodiment of the present invention is directed to identifying certain NLP patterns. For example, patterns may be applied to identify sections (e.g., "Permitted Purpose" or "Process of Experimentation") and generate a score. The score may represent how closely that section corresponds to or matches a particular section or type of section. Other metrics and/or indicators may be applied.

An embodiment of the present invention may determine readability scores which use various methodologies including Kincaid scores, length of words, sentence structure, etc.

An embodiment of the present invention may generate alerts to identify conditions. For example, alerts may be used to flag certain patterns; caution against using certain words (e.g., superlatives, etc.), terms, phrases; identify sentence structure issues (e.g., sentence is too long); avoid using certain words in close proximity; etc. Other negative indicators may be identified.

According to an embodiment of the present invention, users may represent a person drafting a narrative, such as a memo writer. The user may identify sources of information (e.g., list of projects from clients, etc.). The user may then engage or interact with a technology leader, SMEs, etc. Documentation and other supporting data may be retrieved. An analysis may then be performed on the documentation and then used to generate a narrative. The user may interact with an embodiment of the present invention for review, which may be performed on a section-by-section basis.

Accordingly, an iterative process may be applied to improve the strength of the narrative, as indicated by improved scores and/or other metrics.

A benchmark may be applied where the iterative process guides the user to reach the benchmark which may be client, project and/or engagement specific. Certain tasks may be assigned such as clearing alerts, addressing sections with a low readability score, etc.

An embodiment of the present invention may provide guidance and feedback in the form of recommendations and suggestions through a recommendation engine.

An embodiment of the present invention may also be applied to a note taking and/or an interview process. For example, the system may extract information from a note taker during a live interview or other interaction. The system may identify types of language, terms, conversation, patterns, etc. A pattern recognizer may be applied to identify sections (e.g., Permitted Purpose (PP), Elimination of Uncertainty (EoU), Process of Experimentation (PoE), etc.) and then generate corresponding scores.

An embodiment of the present invention may identify a data training set that trains a knowledge base. In this example, a pattern recognizer may identify sections from known good documents that have been curated and deemed successful. For example, the pattern recognizer may be applied to a document, a folder of documents or other collection of data to identify sections from good documents and those sections may be stored and managed in a corpus of information that relate to a particular section, e.g., Permitted Purpose (PP). As a result, an immediate reserve of PP examples that have been curated and deemed good/acceptable may be identified and then used to help guide the user when generating the next narrative or section.

An embodiment of the present invention may be applied to requirements that continue to evolve, such as IRS requirements. As technology evolves, the language and even requirements and acceptable formats may also evolve. Accordingly, this may translate into an evolving set of language patterns and words to avoid.

An embodiment of the present invention may be directed to generating a baseline of knowledge for specific industries, applications, clients, etc. For a particular engagement, an embodiment of the present invention may identify a baseline and then train against documents from a prior time period (e.g., prior year) that have already been through an audit or curation process.

FIG. 1 is an exemplary system diagram, according to an embodiment of the present invention. A template 110 may be submitted to a Document Review Analysis Tool 100. The document or folder of documents to be analyzed may be inputted into a user interface, as shown by 120. Text pattern markers and indicators may be applied and identified. Combination of text patterns identifying a higher level pattern that may be recognized and annotated as an expected section, such as a "Permitted Purpose" in the document under review, as shown by 130. Other sections may include project definition or business component, elimination of uncertainty, process of experimentation, project header, contractor or sections.

Figure 2:
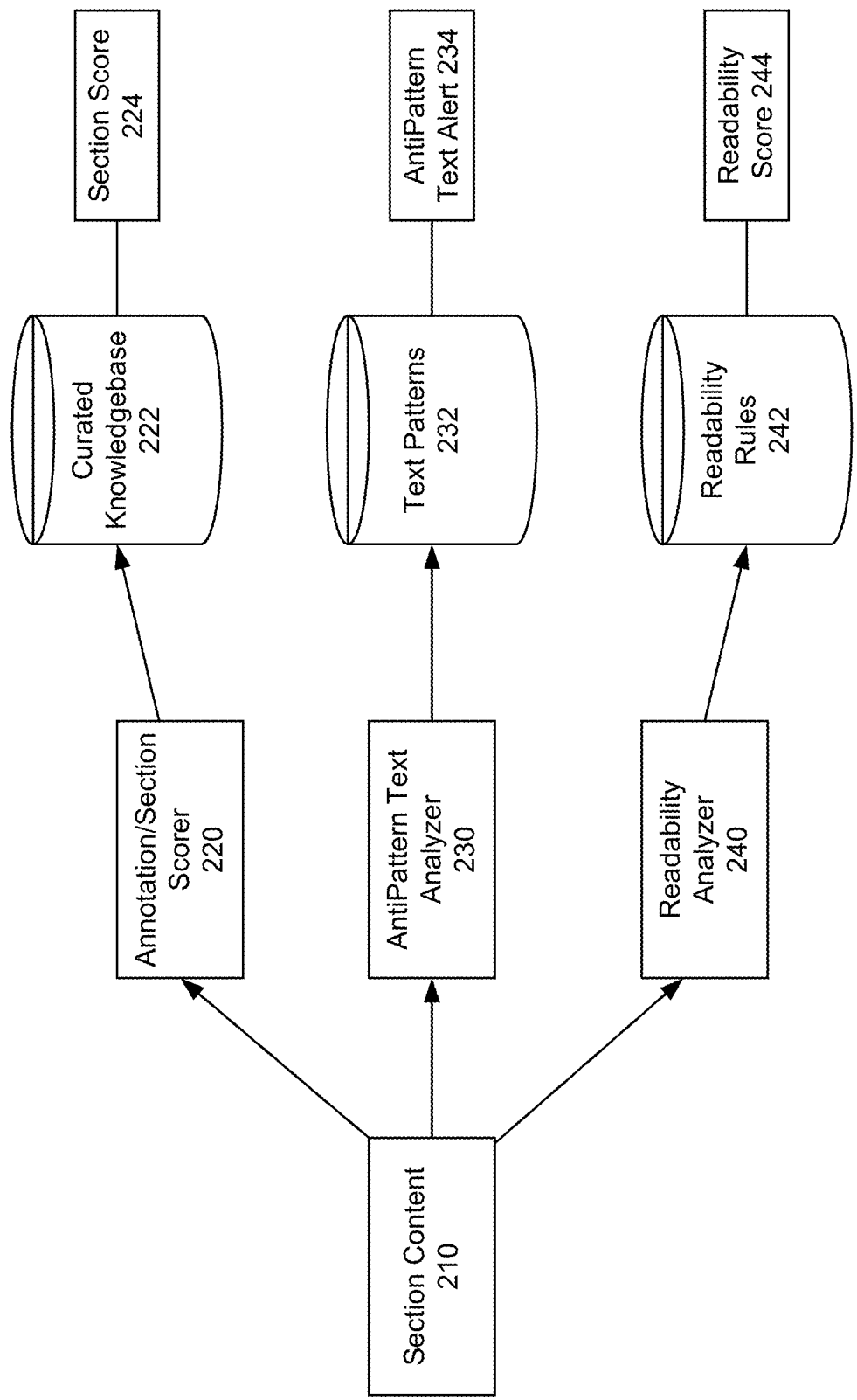
FIG. 2 is an exemplary system diagram, according to an embodiment of the present invention.

FIG. 2 is an exemplary system diagram, according to an embodiment of the present invention. Extracted text content, represented by Section Content 210, may be analyzed by various processors including Annotation/Section Scorer 220, AntiPattern Text Analyzer 230 and Readability Analyzer 240.

Annotation/Section Scorer 220 may interact with a curated knowledge base 222 of "good examples" of Permitted Purpose, Elimination of Uncertainty and other relevant stereotypical sections that show up in commonly used templates. Good examples may generally refer to confirmed or qualifying examples. Based on the analysis, a section score may be generated as shown by 224. The section score may represent how close a specific section in the document being scored is in comparison to the specific curated knowledge base of that same section. A higher score calculated by the solution for the section being evaluated may be indicative of a greater similarity in the proportion and manner of use of words, phrases, sets of words and/or sets of phrases used in the section being evaluated as compared to similar sections in documents curated by human experts and considered to be good examples of documents of a similar nature for a similar purpose as the section and document being evaluated for quality.

Antipattern Text Analyzer 230 may interact with Text patterns (e.g., NLP patterns) of undesirable type of text, as shown by 232. Text types may be grammatical or stylistic (e.g., long sentences, many conjunctions, etc.), key phrases or types of phrases that are counter to the position of the overall memo (e.g., "business as usual"), unsustainable descriptions (e.g., slangs "blazingly fast"), superlatives (e.g., "highest/fastest/best/most efficient"), domain or taxpayer specific; language picked apart during audits/reviews and other inadvisable or inappropriate language. Based on the analysis, antipattern text alerts may be generated as shown by 234. As an example of a text alert, a pattern of text as specified by the Regular Expression, "(very|extremely|blazingly)\s(fast|quick|rapid|slow)" may trigger an alert due to any of the following, but not limited to, phrases:

" . . . this software solution was extremely quick compared to other solutions";

" . . . the competition had a blazingly fast transformer."

The above examples may trigger an alert that may be communicated to the user through a list of similar alerts to be addressed as part of document quality improvement that the user may wish to undertake to improve the quality of the document under review as such alerts indicate to the user some of the reasons why the quality may be sub-standard.

Readability Analyzer 240 may interact and apply readability rules, e.g., Flesch-Kincaid, etc. Readability Rules 242 indicate how difficult a passage is to understand. Based on the analysis, readability score may be generated as shown by 244. Other rules may be applied. A high readability score may indicate to the user that the document viewed contains complex and/or convoluted language. The higher the score, the less it is readable or more complex it is to understand and may need advanced level education or expertise. In other words, a low score is preferred. Other scales, indicators and metrics may be applied.

Figure 3:
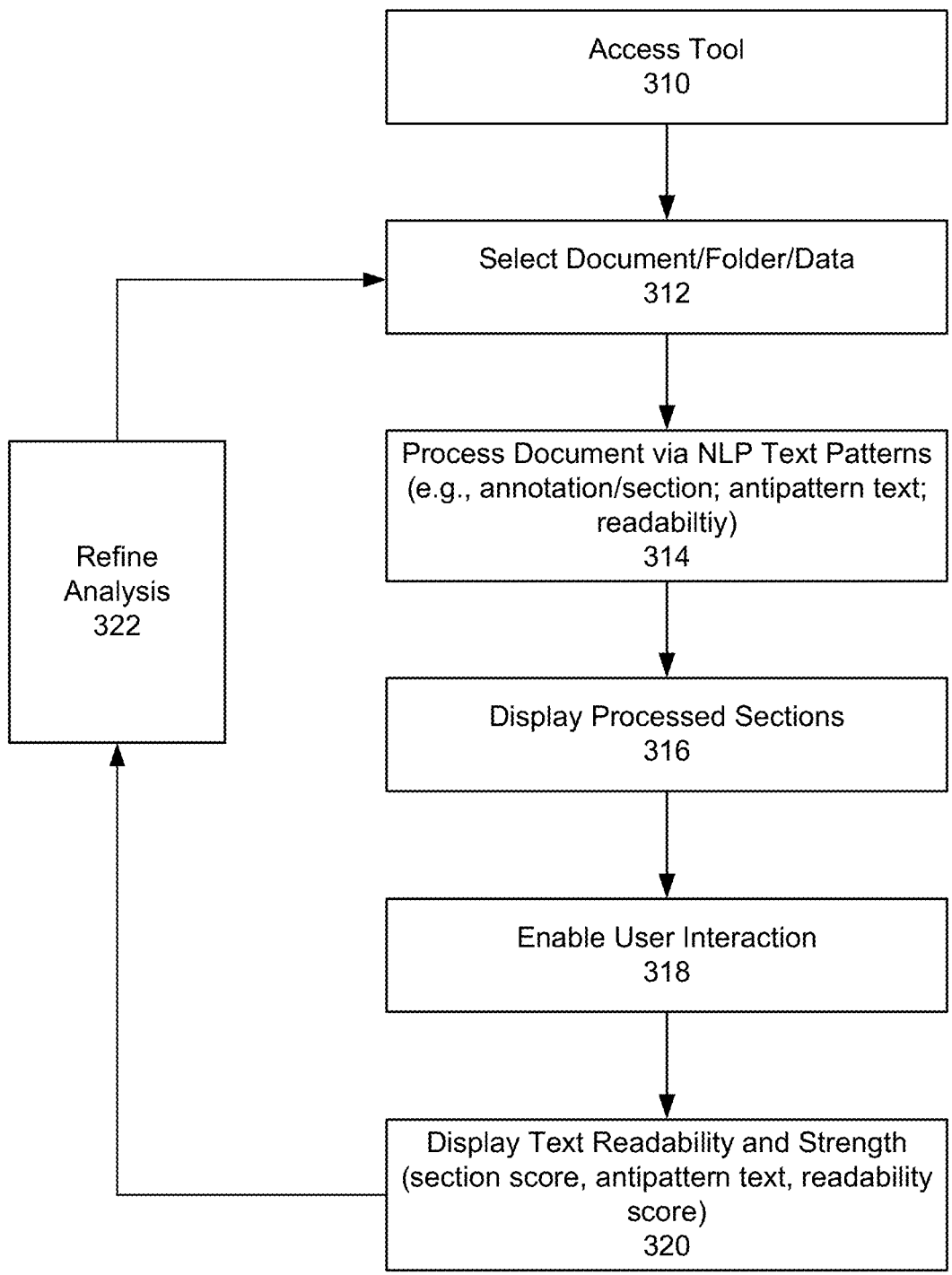
FIG. 3 is an exemplary flow diagram, according to an embodiment of the present invention.

FIG. 3 is an exemplary flow diagram, according to an embodiment of the present invention. At step 310, a user may access the system through a user interface executing on a computer processor. At step 312, the user may select a document, folder of documents or other collection of data. At step 314, the system may process the document via NLP text patterns. This may involve performing an annotation/section analysis; antipattern text analysis and/or readability analysis. At step 316, the system may provide a display generating processed sections for user review. At step 318, the user may interact with one or more sections. At step 320, the system may display corresponding scores or other metrics that indicate text readability and strength. At step 322, results may be applied to refine the analysis. This may involve updating the knowledge base and training set for improved accuracy. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

Figure 4:
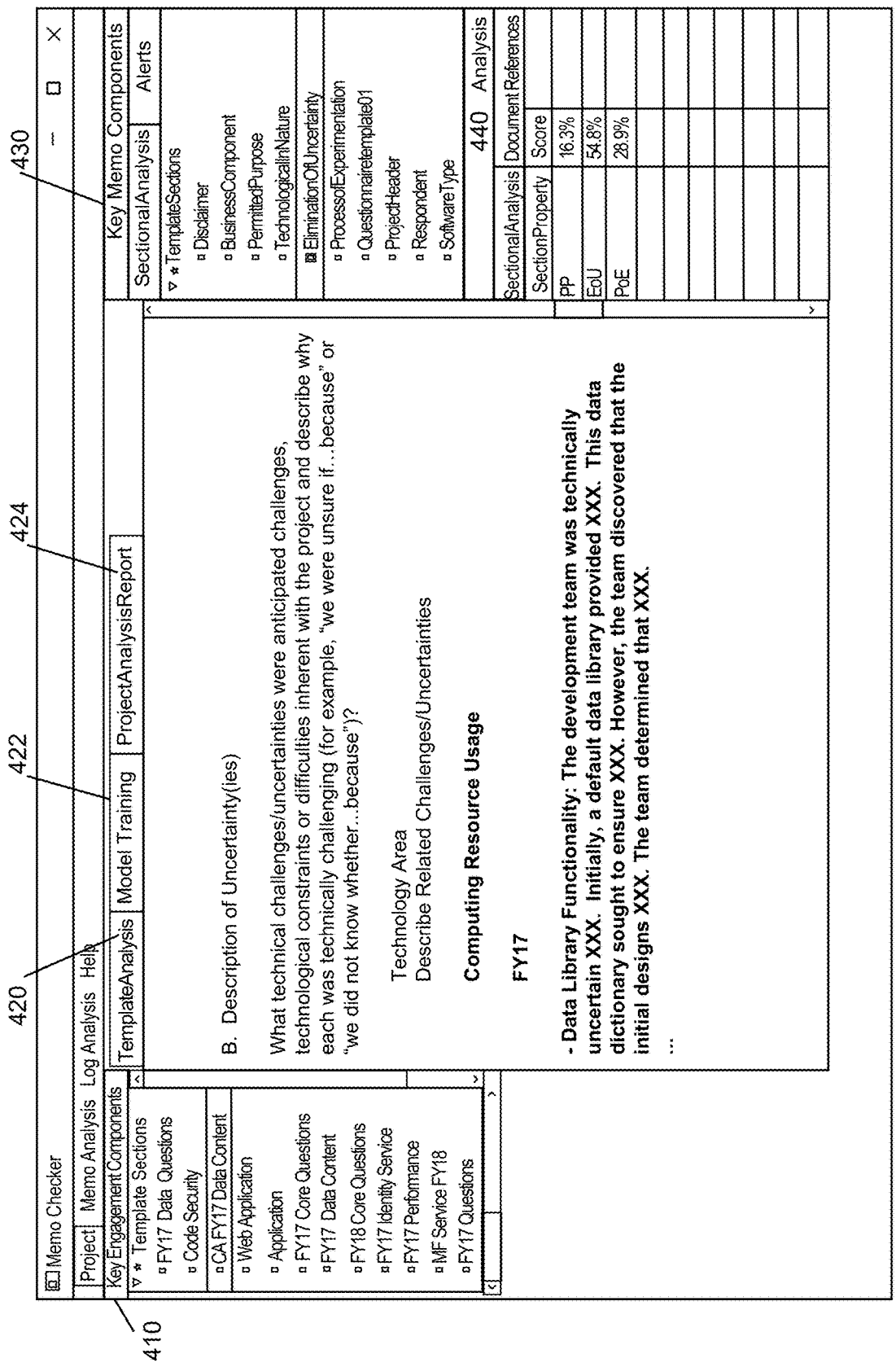
FIG. 4 is an exemplary user interface, according to an embodiment of the present invention.

FIG. 4 is an exemplary user interface, according to an embodiment of the present invention. FIG. 4 illustrates Key Engagement Components 410 that identify template sections.

A text viewer may display Template Analysis 420, Model Training 422 and Project Analysis Report 424. Template Analysis 420 represents an overall analysis of the document where the document structure is validated against a document template to ascertain whether the content of the document under review follows a pre-defined structure, e.g., whether all sections along with their respective section headers and/or titles exist and follow a set sequence or structure.

Model Training 422 refers to enabling the system to learn or determine good and/or preferred values for weights and biases applied to various parameters used to predict certain known or predefined outcomes. For example, certain text content may be considered a good example of "Process of Experimentation" in the R&D Tax Credits example. This combination of the text content itself as well as the label or section header associated with it may be added to a training set. The training set may be examined to determine the various parameters, weights and/or biases that minimize the errors or losses in the prediction of labels from the system as compared to the examples in the training set.

Aggregated or summarized results, alerts, notifications and/or reports of the document conducted for each section in each document within a larger project may be considered to be a Project Analysis Report, as shown by 424.

Key Memo components 430 may identify Section Analysis and Alerts.

Analysis section 440 may identify Section Analysis and Document References. Section Analysis may display Section Property and corresponding scores in percentages (other metrics may be applied). Section Property may include PP (Permitted Purpose), EoU (Elimination of Uncertainty) and PoE (Process of Experimentation).

FIGS. 5 and 6 are exemplary user interfaces, according to an embodiment of the present invention. Alerts may relate to Superlatives 520 and Sentence Many Words 620. Corresponding text may be highlighted and displayed to the user as shown by 510, 610.

An embodiment of the present invention may include Post Technical Interview Feature Set, which may include Transcript Clean Up Tool, Draft Write Up Generator and Suggestions Feature.

If a user inputs a transcript exported from the solution used to conduct the technical interview (e.g., Microsoft Teams, Zoom, Skype, WebEx), the Transcript Clean Up Tool may use NLP and text pattern recognition to cleanse the transcript into a simpler and more usable format. The Transcript Clean Up Tool may take this output and prepopulate a draft qualitative technical narrative. An objective of this feature may include taking a raw transcript from a technical interview discussion and generating a readable format. For example, among other clean up actions, the user may input a raw file in various formats to the feature, to which the tool may cleanse the document by removing unneeded time stamps and consolidating the text within the transcript to reflect the actual flow of the conversation.

If a user inputs notes taken by a human subject matter expert during a technical interview with a taxpayer or a cleansed transcript from the feature above, the Draft Write Up Generator may transform the notes leveraging ML, NLP, and/or other text analysis techniques to parse the text and place it into a draft qualitative technical narrative for the user to review as per user defined templates. Once the draft qualitative technical narrative is presented to the user, the user may directly update the text and be offered suggestions to improve the generated text discussed in the next feature.

The Suggestions Feature may automatically suggest potential improvements the user may reference when updating the technical narrative to achieve a higher score. For example, the Suggestions Feature may recognize weak areas of each section of the write up when comparing to a curated training set of data. If the Suggestions Feature recognizes the write up has gaps in the qualitative facts, which could pose risk to the taxpayer during an audit, an embodiment of the present invention may recommend additional facts needed to support the activity in each section. This feature may also recommend reworded sentences/phrases based on text recognition/NLP for grammatical/stylistic improvements.

An embodiment of the present invention may include a functionality to allow a user to enhance the transcription/notes through an editing feature.

Figure 7:
FIG. 7 is exemplary user interface, according to an embodiment of the present invention.

FIG. 7 is exemplary user interface, according to an embodiment of the present invention. As shown in FIG. 7, alerts may be displayed in an Alerts Section.

FIG. 8 is exemplary user interface, according to an embodiment of the present invention. As shown in FIG. 8, suggestions may be identified and displayed. For example, a tooltip with action suggestions may be displayed, using a template to take the suggestions.

FIG. 9 is exemplary user interface, according to an embodiment of the present invention. As shown in FIG. 9, an interview transcript may be processed. In this example, transcription files may be cleaned and questionnaires may be created to perform additional analysis.

FIG. 10 is exemplary user interface, according to an embodiment of the present invention. As shown in FIG. 10, transcript files may be converted to draft a narrative. A template may be applied to group the answers. For example, this feature may identify the interviewer and interviewee and group corresponding text in the document. According to another example, a pop-up with a combination box list with names of people that appear in the document (in order) may be provided so that the user may make a selection. Other variations and options may be provided.

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements.

The foregoing descriptions provide examples of different configurations and features of embodiments of the invention. While certain nomenclature and types of applications/hardware are described, other names and application/hardware usage is possible and the nomenclature is provided by way of non-limiting examples only. Further, while particular embodiments are described, it should be appreciated that the features and functions of each embodiment may be combined in any combination as is within the capability of one skilled in the art. The figures provide additional exemplary details regarding the various embodiments.

Various exemplary methods are provided by way of example herein. The methods described can be executed or otherwise performed by one or a combination of various systems and modules.

The use of the term computer system in the present disclosure can relate to a single computer or multiple computers. In various embodiments, the multiple computers can be networked. The networking can be any type of network, including, but not limited to, wired and wireless networks, a local-area network, a wide-area network, and the Internet.

According to exemplary embodiments, the system software may be implemented as one or more computer program products, for example, one or more modules of computer program instructions encoded on a computer-readable medium for execution by, or to control the operation of, data processing apparatus. The implementations can include single or distributed processing of algorithms. The computer-readable medium can be a machine-readable storage device, a machine-readable storage substrate, a memory device, or a combination of one or more them. The term "processor" encompasses all apparatus, devices, and machines for processing data, including by way of example a programmable processor, a computer, or multiple processors or computers. The apparatus can include, in addition to hardware, software code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

A computer may encompass all apparatus, devices, and machines for processing data, including by way of example a programmable processor, a computer, or multiple processors or computers. It can include, in addition to hardware, code that creates an execution environment for the computer program in question, e.g., code that constitutes processor firmware, a protocol stack, a database management system, an operating system, or a combination of one or more of them.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computer-readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While the embodiments have been particularly shown and described within the framework for conducting analysis, it will be appreciated that variations and modifications may be affected by a person skilled in the art without departing from the scope of the various embodiments. Furthermore, one skilled in the art will recognize that such processes and systems do not need to be restricted to the specific embodiments described herein. Other embodiments, combinations of the present embodiments, and uses and advantages of the will be apparent to those skilled in the art from consideration of the specification and practice of the embodiments disclosed herein. The specification and examples should be considered exemplary.

What is claimed is:

1. A computer-implemented system for implementing an automated document quality analysis and review tool, the system comprising:
   an interface that is configured to receive one or more documents;
   a memory component that stores and manages data comprising a plurality of known approved documents with one or more confirmed qualifying examples of a plurality of sections relating to a qualified research activity as defined by the United States tax code; and
   a computer processor coupled to the interface and the memory component, the computer processor further configured to:
      identify one or more sections from the one or more documents, wherein the one or more sections relate to one or more of: permitted purpose, elimination of uncertainty, technological in nature and process of experimentation;
      apply the one or more sections to an annotation/section processor that generates a section score based on a curated knowledge base;
      apply the one or more sections to an antipattern text analyzer that identifies one or more undesired text patterns appearing in the one or more sections based on a plurality of rules relating one or more of unsustainable descriptions, superlatives, and grammatical sentence structure, developed by the antipattern text analyzer to generate an antipattern text alert;
      apply the one or more sections to a readability analyzer that applies a readability rule to generate a readability score; and
      provide, an interactive user interface, each of the section score, antipattern text alert and readability score.

2. The system of claim 1, wherein the one or more sections are identified through natural language processing (NLP) using predetermined text patterns.

3. The system of claim 2, wherein the text patterns comprise an anti-pattern that identifies a word or combination of terms that are to be excluded.

4. The system of claim 2, wherein the text patterns are specific to a project.

5. The system of claim 2, wherein the text patterns relate to an ordering of sections.

6. The system of claim 1, wherein the one or more sections are identified through machine learning (ML) to determine how closely a given section matches similar sections in other documents that have approved for an intended purpose.

7. The system of claim 1, wherein the interactive user interface displays one or more alerts that identify at least one negative indicator.

8. The system of claim 1, wherein the interactive user interface comprises a transcript clean-up tool that receives a transcript of a technical interview discussion and applies NLP and text pattern recognition to prepopulate a draft qualitative technical narrative.

9. The system of claim 1, wherein the interactive user interface comprises a draft write-up generator that transforms text input using a text analysis technique to generate a draft qualitative technical narrative.

10. The system of claim 1, wherein the interactive user interface comprises a suggestions feature that automatically suggests one or more improvements to achieve a higher section score or readability score and one or more corresponding updates to a technical narrative.

11. A computer-implemented method for implementing an automated document quality analysis and review tool, the method comprising:
    identifying, via a computer processor, one or more sections from the one or more documents communicated via an interface, wherein the one or more sections relate to one or more of: permitted purpose, elimination of uncertainty, technological in nature and process of experimentation;
    applying the one or more sections to an annotation/section processor that generates a section score based on a curated knowledge base that comprises curated text patterns based on known approved documents;
    applying the one or more sections to an antipattern text analyzer that identifies one or more undesired text patterns appearing in the one or more sections based on a plurality of rules relating one or more of unsustainable descriptions, superlatives, and grammatical sentence structure, developed by the antipattern text analyzer to generate an antipattern text alert
    applying the one or more sections to a readability analyzer that applies a readability rule to generate a readability score; and
    providing, an interactive user interface, each of the section score, antipattern text alert and readability score.

12. The method of claim 11, wherein the one or more sections are identified through natural language processing (NLP) using predetermined text patterns.

13. The method of claim 12, wherein the text patterns comprise an anti-pattern that identifies a word or combination of terms that are to be excluded.

14. The method of claim 12, wherein the text patterns are specific to a project.

15. The method of claim 12, wherein the text patterns relate to an ordering of sections.

16. The method of claim 11, wherein the one or more sections are identified through machine learning (ML) to determine how closely a given section matches similar sections in other documents that have approved for an intended purpose.

17. The method of claim 11, wherein the interactive user interface displays one or more alerts that identify at least one negative indicator.

18. The method of claim 11, wherein the interactive user interface comprises a transcript clean-up tool that receives a transcript of a technical interview discussion and applies NLP and text pattern recognition to prepopulate a draft qualitative technical narrative.

19. The method of claim 11, wherein the interactive user interface comprises a draft write-up generator that transforms text input using a text analysis technique to generate a draft qualitative technical narrative.

20. The method of claim 11, wherein the interactive user interface comprises a suggestions feature that automatically suggests one or more improvements to achieve a higher section score or readability score and one or more corresponding updates to a technical narrative.

* * * * *